Patented Mar. 17, 1953

2,631,991

UNITED STATES PATENT OFFICE 2,631,991

PYRAZOLINE RESINS

Thomas Boyd, Springfield, and Henry A. Walter, Longmeadow, Mass., assignors to Monsanto Chemical Company, St. Louis, Mo., a corporation of Delaware No Drawing. Application August 22, 1951,
Serial No. 243,131

7 Claims. (Cl. 260—67.5)

1

This invention relates to new thermosetting resins. More particularly, the invention relates to resins derived from 3-amino-5-keto-pyrazolines.

One object of this invention is to provide new thermosetting resins.

Another object is to provide resinous condensation products of 3-amino-5-keto-pyrazolines.

These and other objects are attained by condensing a 3-amino-5-keto-pyrazoline with an aldehyde or ketone and, if desired, with an alcohol or phenol.

The following examples are given in illustration and are not intended as limitations on the products of this invention. Where parts are mentioned, they are parts by weight.

Example I

Dissolve 100 parts of 3-amino-5-keto-pyrazoline in 200 parts of formalin (37% formaldehyde). Heat the solution gently with constant stirring until all of the water from the formalin and from the condensation reaction is driven off taking with it excess formaldehyde. A syrupy liquid is obtained which is soluble in organic solvents. The liquid may be cast into a thin film and then heated at 150° C. to obtain an insoluble, infusible hard film. The liquid may also be used as a coating and impregnating medium and hardened after the coating and impregnating process.

Example II

Dissolve 100 parts of 3-amino-5-keto-pyrazoline in 200 parts of formalin (37% formaldehyde). Heat the solution at 40-100° C. to cause the condensation to take place and to remove water and excess formaldehyde. Dissolve the liquid resin thus obtained in 100 parts of methanol. Heat the solution at refluxing temperature and atmospheric pressure for about 15 minutes and then cool. The product is a solution in methanol of a methyl ether of the condensation product of 3-amino-5-keto-pyrazoline and formaldehyde. The solution may be used for coating, impregnating or casting purposes followed by a short heat treatment at 120-200° C. to render the resin insoluble and infusible. The thermoset products are more flexible than the products obtained in Example I.

If Example I is repeated except that the formalin is replaced by an aqueous solution of 180 parts of methyl ethyl ketone, similar results may be obtained.

The 3-amino-5-keto-pyrazoline may be prepared by reacting ethyl cyanoacetate with hydrazine hydrate to form cyanoacetyl hydrazide

2 followed by a cyclization reaction under alkaline conditions. Derivatives of 3-amino-5-keto-pyrazolines in which either one or both of the hydrogen atoms on the carbon atom in the 4 position are substituted by organic radicals may replace all or part of the 3-amino-5-keto-pyrazoline shown in the examples. Thus, compounds such as 4,4-dialkyl-3-amino-5-keto-pyrazolines, 4,4-diaryl-3-amino-5-keto-pyrazolines, 4,4-dialkenyl-3-amino - 5 - keto - pyrazolines, 4,4 - diaralkyl-3-amino-5-keto-pyrazolines and the corresponding mono alkyl, mono aryl, mono alkenyl, and mono aralkyl derivatives may be used. These compounds have the formula:

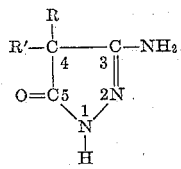

wherein R and R' may be hydrogen, alkyl, aryl, aralkyl, or alkenyl. Specific examples of the groups which may be substituted on the amino-keto-pyrazoline are methyl, ethyl, propyl, butyl, isobutyl, octyl, lauryl, phenyl, naphthyl, benzyl, phenethyl, allyl, methallyl etc. groups.

The aldehydes or ketones which may be used are aliphatic, heterocyclic and aromatic aldehydes or ketones which may be saturated or unsaturated and which may contain organic substituents such as alkoxy, aryloxy, etc. groups. If the aldehyde or ketone used is water-soluble, the reaction may be carried out in an aqueous medium. Otherwise, an inert organic medium such as benzene, xylene, liquid aliphatic hydrocarbons, liquid halogenated hydrocarbons, etc. may be used. When it is desired to prepare the ether resins, the reaction medium may be the alcohol or phenol used to etherify the primary condensation product. From 0.5 to 3.0 mols of aldehyde or ketone may be caused to react with each mol of the pyrazolines of this invention to give useful resins. It is frequently desirable to use an excess of aldehyde or ketone to insure completion of the reaction in a short time. The excess may be removed after the reaction is completed.

The preparation of the condensation product of the pyrazoline and the aldehyde or ketone is carried out by heating a solution of the two components in a mutual solvent. The temperature of the reaction may vary from 20 to 100° C. The reaction goes to substantial completion in a relatively short time in the absence of catalysts. However, either alkaline or acid reacting compounds may be used to catalyze the reaction.

The reaction products range from syrupy liquids to soft solids. They are soluble in water or organic solvents and they are fusible. If the reaction at 20–100° C. is carried out for longer times, hard, fusible products may be obtained which may be molded with or without fillers, under heat and pressure to obtain infusible articles.

The final curing of the resins is carried out at 120–200° C. No catalyst is necessary for the curing reaction but the speed of cure may be accelerated with the use of acid-reacting compounds.

For some purposes, it is desirable to further react the pyrazoline-aldehyde or ketone condensation products while still in the soluble, fusible state with an alcohol or a phenol. The reaction is carried out generally in the presence of an excess of the alcohol or phenol, said excess serving as a reaction medium and as a solvent for the product. If desired, an inert solvent such as aliphatic, aromatic and halogenated hydrocarbons may be used as the solvent. No catalyst is required but acid-reacting compounds expedite the process. Aliphatic and aromatic alcohols and phenols may be used in this step. The alcohols or phenols may be saturated or unsaturated and they may contain substituents such as halogeno, nitro, cyano, amino, etc. groups. The amount of alcohol necessary for the reaction ranges from 0.1 to 1.0 mol per mol of chemically combined aldehyde or ketone. However, an excess of up to 5 mols per mol of aldehyde or ketone is frequently desirable.

The etherification reaction proceeds smoothly at temperatures ranging from 20 to 100° C. and may be carried out simultaneously with the condensation reaction between the pyrazoline and the aldehyde or ketone. The products obtained are soluble, fusible materials which are more flexible than the initial condensation products. They are particularly valuable in coating and impregnating compositions. They may be cured to an insoluble, infusible state by heating at 120–200° C. with or without acidic catalysts.

It is obvious that variations may be made in the products and processes of this invention without departing from the spirit and scope thereof as defined in the appended claims.

What is claimed is:

1. A condensation product of a 3-amino-5-keto-pyrazoline and a compound taken from the group consisting of aldehydes and ketones said pyrazoline having the following formula

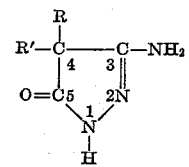

wherein R and R' are taken from the group consisting of hydrogen and alkyl, aryl, aralkyl, and alkenyl radicals.

2. A condensation product as in claim 1 wherein the compound is formaldehyde.

3. A condensation product of 3-amino-5-keto-pyrazoline and formaldehyde.

4. A condensation product of a 3-amino-5-keto-pyrazoline, a carbonylic compound taken from the group consisting of aldehydes and ketones and a hydroxyl compound taken from the group consisting of alcohols and phenols said pyrazoline having the following formula

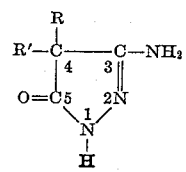

wherein R and R' are taken from the group consisting of hydrogen and alkyl, aryl, aralkyl, and alkenyl radicals.

5. A condensation product of 3-amino-5-keto-pyrazoline, formaldehyde and methanol.

6. A condensation product as in claim 4 wherein the carbonylic compound is formaldehyde.

7. A condensation product as in claim 4 wherein the hydroxyl compound is methanol.

THOMAS BOYD.
HENRY A. WALTER.

REFERENCES CITED

The following references are of record in the file of this patent:

UNITED STATES PATENTS

| Number | Name | Date |
|---|---|---|
| 2,155,863 | Jacobson | Apr. 25, 1939 |
| 2,218,077 | Zerweck | Oct. 15, 1940 |